US008959590B2

(12) United States Patent
Huebler et al.

(10) Patent No.: US 8,959,590 B2
(45) Date of Patent: Feb. 17, 2015

(54) METHOD AND ARRANGEMENT FOR ENABLING THE USE OF A CONSUMABLE UNIT

(75) Inventors: Uwe Huebler, Neuenhagen (DE); Gerrit Bleumer, Schildow (DE)

(73) Assignee: Francotyp-Postalia GmbH, Birkenwerder (DE)

(*) Notice: Subject to any disclaimer, the term of this patent is extended or adjusted under 35 U.S.C. 154(b) by 300 days.

(21) Appl. No.: 13/337,404

(22) Filed: Dec. 27, 2011

(65) Prior Publication Data
US 2012/0222094 A1    Aug. 30, 2012

(30) Foreign Application Priority Data

Dec. 29, 2010  (DE) .......................... 10 2010 056 349
Mar. 2, 2011   (DE) .......................... 10 2011 012 874

(51) Int. Cl.
G06F 7/04       (2006.01)
G07B 17/00      (2006.01)
G06F 21/44      (2013.01)
G06Q 50/32      (2012.01)

(52) U.S. Cl.
CPC ............ *G07B 17/0008* (2013.01); *G06F 21/44* (2013.01); *G06Q 50/32* (2013.01); *G07B 17/00435* (2013.01); *G07B 2017/00169* (2013.01); *G07B 2017/00516* (2013.01)
USPC ............................................................ 726/4

(58) Field of Classification Search
CPC ... H04L 63/08; H04L 63/102; G06F 21/6218; G06F 21/608; G09C 3/06
USPC ...................................... 706/4; 380/55; 726/4
See application file for complete search history.

(56) References Cited

U.S. PATENT DOCUMENTS

| 5,694,156 | A  |   | 12/1997 | Hoisington et al. |
| 6,978,255 | B1 |   | 12/2005 | Pauschinger et al. |
| 7,047,221 | B1 | * | 5/2006  | Hetzer et al. .................... 705/50 |
| 8,015,117 | B1 | * | 9/2011  | Lillibridge et al. ............ 705/74 |
| 2003/0030707 | A1 |  | 2/2003 | Sasaki |
| 2003/0126079 | A1 | * | 7/2003 | Roberson et al. ............... 705/40 |
| 2007/0217848 | A1 |  | 9/2007 | Kojima |
| 2008/0154799 | A1 |  | 6/2008 | Campagna et al. |

* cited by examiner

*Primary Examiner* — Teshome Hailu
(74) *Attorney, Agent, or Firm* — Schiff Hardin LLP (57) ABSTRACT

In a method for enabling the use of a consumable unit in a consumption device of a consumption arrangement, a first item of authorization information assigned to the consumable unit is transmitted from the consumption arrangement to a remote data center. The data center implements a first verification of the first item of authorization information and, as a function of this verification, a second item of authorization information assigned to the consumable unit is generated. The second item of authorization information is transmitted to the consumption arrangement, which implements a second verification of the second item of authorization information, dependent on which use of the consumable unit in the consumption device is enabled. The outcome of either the first or second verification is also used for an accounting for use of the consumable unit when, the first verification indicates that the consumable unit was previously unused.

14 Claims, 3 Drawing Sheets

METHOD AND ARRANGEMENT FOR ENABLING THE USE OF A CONSUMABLE UNIT

BACKGROUND OF THE INVENTION

1. Field of the Invention

The present invention relates to a method for enabling the use of a consumable unit containing a consumable medium in a consumption device of a consumption arrangement, in particular a franking machine, in which in a first transmission step a first item of authorization information assigned to the consumable unit is transmitted by a data processing unit of the consumption arrangement via a communications network to a remote data center and in a first verification step in the data center a verification of the first item of authorization information takes place. In an authorization step in the data center as a function of the outcome of the first verification step a second item of authorization information assigned to the consumable unit is generated, which, in a second transmission step, is transmitted via a communications network to the data processing unit. In a second verification step, a verification takes place in the data processing unit of the second item of authorization information, wherein then in an enabling step in the data processing unit as a function of the outcome of the second verification step enabling the use of the consumable unit in the consumption device takes place. Further, in an accounting step as a function of the outcome of the first verification step and/or the second verification step accounting takes place for enabling the use of the consumable unit in the consumption device. The invention also relates to a corresponding arrangement for performing the method according to the invention and a data processing device that constitutes a component of this arrangement.

2. Description of the Prior Art

In a large number of applications, in which a physical representation of certain data (for example the printing out of data or similar) is generated, consumable materials are used for the generation of this physical representation, having certain properties, in order to guarantee a specified quality of the representation and/or optionally in conjunction with other features of the representation to prove the authenticity of the data reproduced or the authorization to generate the reproduction. Thus for example in modern franking machines as a rule special inks or toners specified by the postal service concerned are used in order to generate a validate franking imprint. The inks or toners used can also have certain security features that are invisible to the naked eye (such as for example fluorescent particles or similar).

In order to ensure that in connection with such a reproduction exclusively authorized consumable materials are used, a number of methods are known which should guarantee that only authorized consumable units (for example ink cartridges, ribbon cartridges, toner cartridges, etc.) are enabled for use in the consumption devices concerned.

Inter alia, in a number of methods applied locally in the franking machine, as known for example from EP 1 237 725 B1, authorization information stored in a memory of the consumable unit is verified in the franking machine, for example a digital signature of the manufacturer of the consumable unit is verified via specific information assigned to the consumable unit. Only if this verification is successful is the use of the consumable unit enabled. Otherwise printing is disabled. Similar methods are known from EP 1 132 868 A1 and EP 0 875 862 A2.

In other methods such as for example those known from EP 1 103 924 B1, a data center compares a code word sent by a franking machine via a communications network with a list of valid code words available in the data center. If this verification is unsuccessful, counter measures including disablement of the franking machine for use of the consumable unit can be initiated. A similar method is also known from DE 100 23 145 A1. In a further similar method, which is known from EP 1 103 925 B1, the franking machine holds a list of valid code words for the comparison.

Finally, from EP 1 103 925 A1 a generic method is known in which following use of an authorized consumable unit for a specific number of imprints further use of the franking machine is inhibited, even if sufficient ink is left for continued usage. Further use of the remaining ink is made possible, however, if in an enabling process in the interaction between the franking machine and a data center, against a corresponding payment by the user in an accounting process, a corresponding enablement takes place.

Common to all these methods is that correspondingly high effort is necessary in order to ensure that in the consumption device only authorized consumable units are used. This results in comparatively high costs for the individual consumable unit. Here in addition to some extent there is only limited protection, if any, against the use of pirate products or of previously authorized consumable units that have been refilled by third parties. Such unauthorized consumable units are typically sold at considerably lower prices than authorized consumable units, so that in this regard the economic pressure to achieve greater security increases further and the costs are forced up.

Thus in the memory known from EP 1 103 925 A1 of the consumable unit in fact the consumption or the residual quantity left is detected and the use of the consumable unit is inhibited as soon as a certain residual quantity is reached. In many cases, however, it is possible to manipulate the memory of the consumable unit. As a counter measure to this, memories with write once memory areas can be used although these drive up the costs. In addition third parties may try to exchange the "used" memory for a possibly even structurally identical "unused memory". Here again various counter measures can be taken, although these again push up the costs.

SUMMARY OF THE INVENTION

An object of the present invention is to provide a method and an arrangement as well as a data processing device for such an arrangement of the kind mentioned at the beginning, which does not, or at least only to a lower extent, have the abovementioned disadvantages and in a particularly cost-effective manner provides a high level of protection against the use of unauthorized consumable units.

The present invention is based on the technical teaching that a simple and cost-effective way of providing a high level of protection against the use of unauthorized consumable units is possible if the accounting takes place when during the verification of the first item of authorization information assigned to the consumable unit it is ascertained in the data center that the consumable unit has previously been unused. In this way it is possible for the user of the consumable unit, for example, only at the time of the first verification of the consumable unit, via the accounting process to pay a corresponding usage fee, so that the selling price of the consumable unit initially and without any economic disadvantage for the provider of authorized consumable units can be kept low. Subsequent payment with the initial verification or use of the consumable unit considerably reduces the economic incentive to bring into circulation unauthorized consumable units, since the cost advantage of unauthorized consumable units over authorized consumable units can at least in large measure be eliminated and in addition by means of the verification at the data center in a simple manner unauthorized consumable units can be detected and rejected.

It is in particular sufficient in the data center to simply maintain a list with the data that are used in the first verification step for authorized consumable units. Here, with this data that is available in the data center, in the first verification step simple plausibility checks can be carried out which allow manipulations or other discrepancies in the data assigned to the consumable unit to be discovered and thus unauthorized consumable units or those subsequently manipulated in an unauthorized manner to be detected and then optionally not enabled for use.

For example, an unauthorized refilling of a consumable unit with the consumable medium can be detected in a simple manner in that the usage level of the consumable unit (the detection of which can in any event be used for the detection of the unused level of the consumable unit in connection with the accounting) is logged in a corresponding data record in the data center for the respective consumable unit after the registration (carried out in course of or following the initial verification) of the consumable unit in the data center. If a further verification takes place at a later point in time and an implausible fill level of the consumable medium in the consumable unit (for example a higher fill level than for the last verification) results, then this lead to the conclusion of an unauthorized manipulation with enabling the use of the consumable unit being rejected.

This registration of the consumable unit and the subsequent logging of certain data assigned to the consumable unit, which for its part is called upon as comparative data during subsequent repeat verifications of the data originating from the consumable unit, also has the advantage that both the data stored, for example, in a memory of the consumable unit and the memory itself can be of a relatively simple design. A manipulation or exchange of the memory of the consumable unit and of the data in this memory are, thanks to the manipulation-proof storage of the comparative data in the data center, reliably detected. The same applies if the data of an authorized consumable unit, for example its valid identification, are copied, since by means of the logging in the data center parallel use of a valid identification for several consumable units can be detected and thus avoided.

According to one aspect the present invention therefore relates to a method for enabling the use of a consumable unit containing a consumable medium in a consumption device of a consumption arrangement, in particular a franking machine, in which in a first transmission step a first item of authorization information assigned to the consumable unit is transmitted by a data processing unit of the consumption arrangement via a communications network to a remote data center and, in a first verification step in the data center, a verification of the first item of authorization information takes place. In an authorization step, in the data center as a function of the outcome of the first verification step, a second item of authorization information assigned to the consumable unit is generated, which is then transmitted in a second transmission step via a communications network to the data processing unit. In a second verification step in the data processing unit a verification of the second item of authorization information takes place and, in a subsequent enabling step as a function of the outcome of the second verification step, enabling the use of the consumable unit in the consumption device. Here, in an accounting step as a function of the outcome of the first verification step and/or the second verification step, accounting takes place for enabling the use of the consumable unit in the consumption device, wherein the accounting step takes place provided that, in a detection step of the first verification step, it is established that the consumable unit was previously unused.

Detection of the fact that the consumable unit is unused, can take place in any suitable manner. Preferably the first item of authorization information comprises an, in particular unique and unambiguous, first item of identification information of the consumable unit (for example a unique and unambiguous serial number of the consumable unit), wherein the ascertainment that the consumable unit is unused takes place in the ascertainment step using the first item of identification information. In the simplest case it is detected that the first item of identification information for the first time has been transmitted from a remote data processing unit to the data center and used in a first verification step. For this ascertainment however, as will be illustrated in the following, additionally or alternatively further criteria can be applied.

In preferred variants of the invention the first item of identification information is compared with a first comparative item of identification information stored in the data center, wherein the ascertainment of an unused consumable unit in the ascertainment step only takes place, if for the first time a definable relationship between the item of identification information and the first comparative item of identification information exists. Thus, for example, in the simplest case as the first comparative item of identification information an item of information that is identical to the first item of identification information can be stored in the data center, so that only upon the first ascertainment of the identity of both these items of information is an unused consumable unit assumed.

It is particularly advantageous if the first item of authorization information comprises a first item of fill level information, which is representative of the quantity of the consumable medium available in the consumable unit, and the ascertainment that the consumable unit is unused, using the first item of fill level information. For this purpose, in the data center, a comparative item of fill level information can be stored, which is compared with the transmitted first item of fill level information. If there is a definable relationship between the first item of fill level information and the comparative item of fill level information, then the consumable unit is classified as unused and the accounting performed accordingly. Here, for the deviation between the two compared items of fill level information certain tolerances can be envisaged, in order to take into account a plausible shrinkage of the consumable medium (for example through natural evaporation or similar) or tolerance values in the factory filling of the consumable units.

In doing so, of course a distinction can be made between the directions of the deviation. So for a downward deviation, thus in the event that a lower quantity is available than expected for an unused consumable unit, a greater deviation will be allowed than for an upward deviation, thus in a case in which a larger quantity is available than expected. Optionally, of course, it can also be provided that such an upward deviation always leads to a denial of use and thus with it a rejection of the consumable unit.

In further preferred variants of the method according to the invention the first item of identification information comprises an item of control information, which is generated, in particular, using a cryptographic means. The verification of the first item of authorization information in the first verification step then comprises a verification of whether a definable relationship between the item of control information and a further part of the first item of identification information exists, wherein enabling the use of the consumable unit only takes place if the definable relationship between the item of control information and the further part of the first item of identification information exists.

This item of control information avoids in a simple manner a third party being able to independently generate a valid first item of identification information. This increases the protection from manipulation further, since in this case at worst a valid item of identification information is copied from an authorized consumable unit and can be transferred to other consumable units, wherein out of all these consumable units with the same item of identification information (thus the originally authorized consumable unit and the copies made on the basis of this) only one can be used.

The item of control information can be any suitable item of information that has been generated using a secret (thus an item of information and/or algorithm known only the producer of the consumable unit). Thus, the item of control information can be generated by means of any suitable cryptographic operations, in which such a secret is used as a cryptographic code. A digital signature of at least part of the item of identification information may in particular be involved.

Similarly, in addition or alternatively, however, a cryptographic algorithm, for example a so-called hash algorithm (such as for example SHA-1, SHA256, MD4 etc.), may simply be applied to at least part of the item of identification information. Here the secret can consist of the fact that the cryptographic algorithm used, and/or the part of the item of identification information, to which such a cryptographic algorithm is applied, is unknown to third parties. This in itself can also ensure a sufficient degree of security, since the reconstruction of the original data even with a large quantity of items of identification information produced according to this pattern would require a great deal of computational effort.

In further preferred variants of the method according to the invention, in the authorization step, in the data center in a registration step a registration takes place of the first verification step in a verification history stored in the data center and assigned to the consumable unit, in particular, of the associated first item of identification information. This verification history allows in a particularly simple manner the plausibility checks already mentioned, which can be carried out in order to detect manipulations of the data of an authorized consumable unit and/or unauthorized consumable units.

The verification history assigned to the respective consumable unit or its item of identification information can basically comprise any information which can be used for such plausibility checks. Here, it shall be understood that this information can be detected in the data center or transmitted to the data center in any suitable manner. Corresponding information detected in the data processing unit or transmitted by this can in particular be incorporated in the first item of authorization information.

Thus, for example, it can be provided that the verification history comprises the number of first verification steps performed assigned to the consumable unit or the associated first item of identification information. In this way, therefore, a count can be kept of how often in the past for the consumable unit concerned the first verification step has already been carried out. In this case, initially in a particularly simple manner, the ascertainment of an unused consumable unit or the detection of the first performance of the first verification can take place, since all that has to be ascertained is that the counter of the verification history assigned to the consumable unit is at a value of zero.

Likewise, with this number of first verification steps further security-related verifications can be performed. Thus, for example from a large number of first verification steps within a specified time span possible manipulations or attempted manipulations can be inferred and responded to accordingly. Here, the response may range from a mere warning to the user of the consumption device to disablement of the consumption device.

In further variants of the invention the verification history comprises at least for the point in time of the current first verification step representative verification time information. Through this detection and logging of the point in time of the current first verification step similarly the temporal course of the use of the consumable unit can be inferred and, thus, possible manipulations or attempted manipulations and a corresponding response can be made as described above.

In particular, for the respective consumable unit an item of initial verification time information representative of the point in time of the first execution of the first verification step can be stored in the verification history. With this item of initial verification time information it can, for example, be verified if a particular maximum usage time of the consumable unit has already been exceeded and then, again, a corresponding response can be made (issue of a warning message, disablement of use, etc.).

In preferred variants of the invention it is therefore provided that in the first verification step a comparison of the current time information with the item of initial verification time information from the verification history assigned to the consumable unit is performed and enabling the use in the enabling step only takes place if a definable relationship between the current time information and the item of initial verification time information exists, in particular, a time difference resulting from the current time information and the item of initial verification time information is less than a definable maximum usage time of the consumable unit.

In addition, the verification history assigned to the respective consumable unit can comprise a second item of identification information assigned to the data processing unit. In this way, therefore, the registration of the consumable unit can be linked to the consumption device, with which it is used. The second item of identification information can, for example, be sent as a component of the first item of authorization information in the first transmission step.

In this way it is, for example, possible to allow the use of the consumable unit only in combination with the consumption device with which its first registration took place. It is likewise possible to define, in the data center, a group of consumption devices or data processing units, for which the use of a consumable unit is authorized, provided that the first registration (thus the first execution of the first verification step) took place in connection with one of the data processing units from this group. Thus, for example, the owner of a group of franking machines can be allowed to use an authorized consumable unit in various franking machines of this group.

In preferred variants of the invention it is therefore provided that the first item of authorization information comprises a second item of identification information assigned to the data processing unit, in the first verification step a comparison of the second item of identification information and at least a previous second item of identification information from the verification history assigned to the consumable unit is performed, which originates from a previous authorization step, in particular, the last authorization step previously carried out, and enabling the use in the enabling step only takes place if a definable relationship between the second item of identification information and the previous second item of identification information exists, in particular the second item of identification information is identical to the previous second item of identification information.

In further preferred variants of the method according to the invention the verification history assigned to the respective consumable unit comprises at least a first item of fill level information representative of the current quantity of the consumable medium available. With this item of fill level information it is possible in a particularly simple manner to detect manipulations of the consumable unit, in particular, unauthorized refilling of the consumable unit. Thus, for example, an increase in the available quantity of the consumable medium is a clear indication of refilling of the consumable unit.

Similarly, a fill level that is constant or only falls slightly is indicative of such manipulation. In order to be able to recognise such situations easily, in advantageous variants of the invention, it can be provided that the data processing unit, for example embedded in the first item of authorization information, provides information on the number of uses of the consumable unit since the last enabling step. This allows a simple plausibility check on the current fill level of the consumable unit transmitted.

In preferred variants of the invention it is therefore provided that the first item of authorization information comprises a first item of fill level information, which is representative of the quantity of the consumable medium available in the consumable unit. In the first verification step a comparison is made between the first item of fill level information and an item of fill level limit information assigned to the consumable unit and/or at least a previous first item of fill level information from the verification history assigned to the consumable unit, which originates from a previous authorization step, in particular the last authorization step previously carried out. Enabling the use in the enabling step then only takes place if a definable relationship between the first item of fill level information and the previous first item of fill level information exists, in particular, the available quantity of the consumable medium is smaller than the previously available quantity of the consumable medium from the previous authorization step.

Additionally or alternatively, in a definitive disabling step, a permanent disabling of use of the consumable unit can take place if a definable relationship between the first item of fill level information and the previous first item of fill level information exists, in particular the available quantity of the consumable medium is greater than the previously available quantity of the consumable medium from the previous authorization step, since this can be considered as a clear indication of unauthorized refilling of the consumable unit.

Additionally or alternatively, in a definitive disabling step a permanent disablement of the use of the consumable unit can take place, if a definable relationship between the first item of fill level information and the item of fill level limit information exists, in particular the available quantity of the consumable medium has reached or fallen below a limiting quantity of the consumable medium defined by the item of fill level limit information. In this way therefore a "consumable unit empty" state can be detected and use permanently disabled, in order to prevent unauthorized refilling and reuse of the consumable unit.

This can be carried out in a particularly effective manner in that, in the definitive disabling step, the consumable unit, in particular the first item of identification information, in the data center is assigned an item of disabling information, in the first verification step a verification is performed, whether the consumable unit has been assigned an item of disabling information, and enabling the use only takes place in the enabling step, if the consumable unit does not have an item of disabling information assigned to it. In this way, therefore, the consumable unit is registered in the data center as disabled or the consumable unit is deregistered in the data center, in order to prevent unauthorized refilling and reuse of the consumable unit. Alternatively the first item of identification information (e.g. a serial number) can simply be deleted from the list available in the data center of valid first items of identification information (e.g. a list of valid serial numbers).

In preferred further variants of the invention it is provided that the first transmission step takes place as a function of the occurrence of at least one definable first event. Here, it can for example be a case of any temporal event such as the reaching of a certain date, the expiry of a certain length of time or similar.

Additionally or alternatively, the at least one definable first event can preferably be a non-temporal event. Here also any non-temporal event can be applied. Thus for example the first event may be the creation of a connection between data processing unit and the consumable unit. In this way for example it can be ensured in a simple manner that for each use of a consumable unit in the consumption device a verification takes place of whether this is authorized and has not been manipulated.

Additionally or alternatively, the definable first event can be the release of a connection between the data processing unit and the consumable unit. In this way, for example, it can be ensured in a simple manner that each time a consumable unit is removed from the consumption device it is not only a verification that this is authorized and has not been manipulated that takes place. On the contrary, in this way, for example, it can also be ensured that the verification history described above is updated (e.g. a stored item of fill level information etc. is updated). An unauthorized refilling can in this way be effectively avoided.

Additionally or alternatively, the definable first event can be the reaching of a definable first number of uses of the consumable unit and/or the reaching of a definable first consumption of the consumable medium and/or the reaching of a definable first quantity of the consumable medium still available in the consumable unit. All these variants can serve to keep the verification history up to date and thus effectively make more difficult or prevent an unauthorized refilling or other manipulation.

In preferred further variants of the invention it is provided that, in a temporary disabling step, a reversible disabling of use of the consumable unit takes place as a function of the occurrence of at least one definable second event. Here also it can be a case, for example, of any temporal event, such as the reaching of a certain date, the expiry of a certain length of time or similar. Thus, for example, upon expiry of a certain length of time following initiation of a first transmission step the reversible disabling can take place.

Additionally or alternatively, the at least one definable second event can preferably be a non-temporal event. Here again any non-temporal events can be used. Thus the at least one definable second event can be the release of a connection between the data processing unit and the consumable unit and/or the reaching of a definable second number of uses of the consumable unit and/or the reaching of a definable second consumption of the consumable medium and/or the reaching of a definable second quantity of the consumable medium still available in the consumable unit.

Additionally or alternatively, the temporary disabling step can take place only if, following the last occurrence of the first event and prior to the occurrence of the second event, no enabling step takes place. In other words, if an enabling step takes place on time then the disablement does not occur.

The data transmission between the data processing unit and the data center can basically take place in any suitable manner, wherein any communications networks can be used which at least in part work wirelessly and/or at least in part in a wire-bound manner. The communication can take place unencrypted. Preferably, however communications secured against undetected unauthorized manipulation by cryptographic means are provided.

The first item of authorization information, preferably at least prior to the first transmission step and/or during the first transmission step, is secured by cryptographic means against undetected unauthorized manipulation. Additionally or alternatively, the second item of authorization information at least prior to the second transmission step and/or during the second transmission step is secured by cryptographic means against undetected unauthorized manipulation.

In further preferred variants of the invention it is provided that the second item of authorization information at least comprises a cryptographic certificate generated by the data center in the authorization step, which in a verification step of the enabling step is verified by the data processing unit, and enabling the use takes place as a function of the outcome of the verification step.

This cryptographic certificate is especially in the further procedure also used in connection with a subsequent first verification step, in order to check the authorization of the consumable unit. To this end, the cryptographic certificate assigned to the respective consumable unit with its registration is preferably logged in the data center, in that it is for example included in the verification history assigned to the consumable unit. In further advantageous variants of the invention the verification history therefore comprises at least a part of the second item of authorization information, in particular the entire second item of authorization information, wherein of course the cryptographic certificate can then be included as a corresponding part of the second item of authorization information in the verification history assigned to the consumable unit.

In order to use the cryptographic certificate in connection with a subsequent first verification step, in order to check the authorization of the consumable unit, the first item of authorization information for its part can then comprise a cryptographic certificate generated in a preceding authorization step, in particular directly preceding the first transmission step, wherein the previous cryptographic certificate can be verified in the first verification step, for example compared with the certificate stored in the verification history. Optionally, however, additionally or alternatively, just a simple verification of the certificate can take place.

In further preferred variants of the invention it is provided that in the data processing unit after the enabling step a detection of the consumption of the consumable medium takes place, in order then in a simple manner to allow the forwarding described above of a fill level or similar to the data center and the plausibility checks described.

For this, preferably using a use detected by the data processing unit of the consumable unit and/or a previous item of fill level information, a theoretical item of fill level information is identified, which is representative of the theoretical quantity of the consumable medium available in the consumable unit. Additionally or alternatively, for this purpose by means of a detection unit an actual item of fill level information is identified, which is representative of the actual quantity of consumable medium available in the consumable unit.

Here, the theoretical item of fill level information can be compared with the actual item of fill level information in the data processing unit in a fill level checking step and the theoretical item of fill level information can be set to the value of the actual item of fill level information, if the actual available quantity is less by a definable first tolerance value than the theoretical available quantity. In other words, so that in this regard the "theoretical" value is reset to the "actual" value.

In a disabling step, however, disabling of use of the consumable unit by the data processing unit can take place, if the actual available quantity exceeds the theoretical available quantity by a definable second tolerance value, since this can be considered as an indication of an unauthorized refilling of the consumable unit.

The accounting described above for the first verification and, optionally, registration of the consumable unit can take place in any suitable way. Preferably, in the accounting step for performing the accounting the content of at least one accounting memory is modified. This at least one accounting memory can be arranged in the data processing unit. Thus, for example, a correspondingly secured accounting memory that is available anyway in a franking machine can be used for this accounting step, in that its register statuses are modified accordingly. Additionally or alternatively, the at least one accounting memory can be arranged in the data center, so that the accounting therefore takes place there.

In preferred further variants of the invention it is provided that, in a production step prior to the first verification step, a plurality of first consumable units and second consumable units is produced, wherein, in particular in a memory of a first consumable unit, a first item of identification information of the first consumable unit is assigned a first identifier and, in particular in a memory of a second consumable unit, a first item of identification information of the second consumable unit is assigned a second identifier, and at least a verification of a definable relationship between first items of information and second items of information takes place in the first verification step and/or in the authorization step and/or in the second verification step and/or in the enabling step and/or in a fill level verification step as a function of the identifier assigned to the consumable unit. Additionally or alternatively, at least a monitoring of the occurrence of a definable event as a function of the identifier assigned to the consumable unit takes place. In this way in a simple manner it is possible to produce or define consumable units, which are handled differently in use, for example having different privileges, which manifest themselves in tolerance ranges of different extents during the individual verifications or similar.

The present invention further relates to an arrangement for performing the method according to the invention described above with a consumable unit containing a consumable medium, a consumption arrangement, in particular a franking machine, which comprises a consumption device designed for use of the consumable unit and an associated data processing unit for control of use of the consumable unit, as well as a data center remote from the consumption arrangement, which via a communications network can be connected to the data processing unit. The data processing unit is designed so that in a first transmission step it transmits a first item of authorization information assigned to the consumable unit via the communications network to the remote data center, while the data center is designed so that, in a first verification step, it performs a verification of the first item of authorization information. The data center is further designed to generate, in an authorization step as a function of the outcome of the first verification step, a second item of authorization information assigned to the consumable unit. In addition, the data center is designed so that in a second transmission step it transmits the second item of authorization information via a communications network to the data processing unit. The data processing unit is in turn designed so that, in a second verification step, it carries out a verification of the second item of authorization information and, in an enabling step as a function of the outcome of the second verification step, carries out enabling the use of the consumable unit in the consumption device. In addition, the data processing unit and/or the data center is designed so that, in an accounting step as a function of the outcome of the first verification step and/or the second verification step, it performs an accounting for the enabling for use of the consumable unit in the consumption device, wherein the data processing unit and/or the data center is designed to perform the accounting step, provided that in an ascertainment step of the first verification step it is ascertained that the consumable unit was previously unused. In this way the variants and advantages described above can be achieved to the same degree, so that in this respect reference is made to the above statements.

Finally, the present invention relates to a data processing device, which is designed as the data processing unit of the arrangement according to the invention with the features described above, wherein it is in particular designed to perform the accounting step. Finally, the present invention relates to a data processing device which is designed as the data center of the arrangement according to the invention with the features described, wherein it is in particular designed to perform the accounting step. In this way also the variants and advantages described above can be achieved to the same degree, so that in this respect reference is made to the above statements.

DESCRIPTION OF THE PREFERRED EMBODIMENTS

In the following by reference to FIGS. 1, 2A and 2B (which in the following are also referred to jointly as FIG. 2) a preferred configuration of the arrangement 101 according to the invention is described, with which a preferred variant of the method according to the invention for enabling the use of a consumable unit is carried out.

Figure 1:
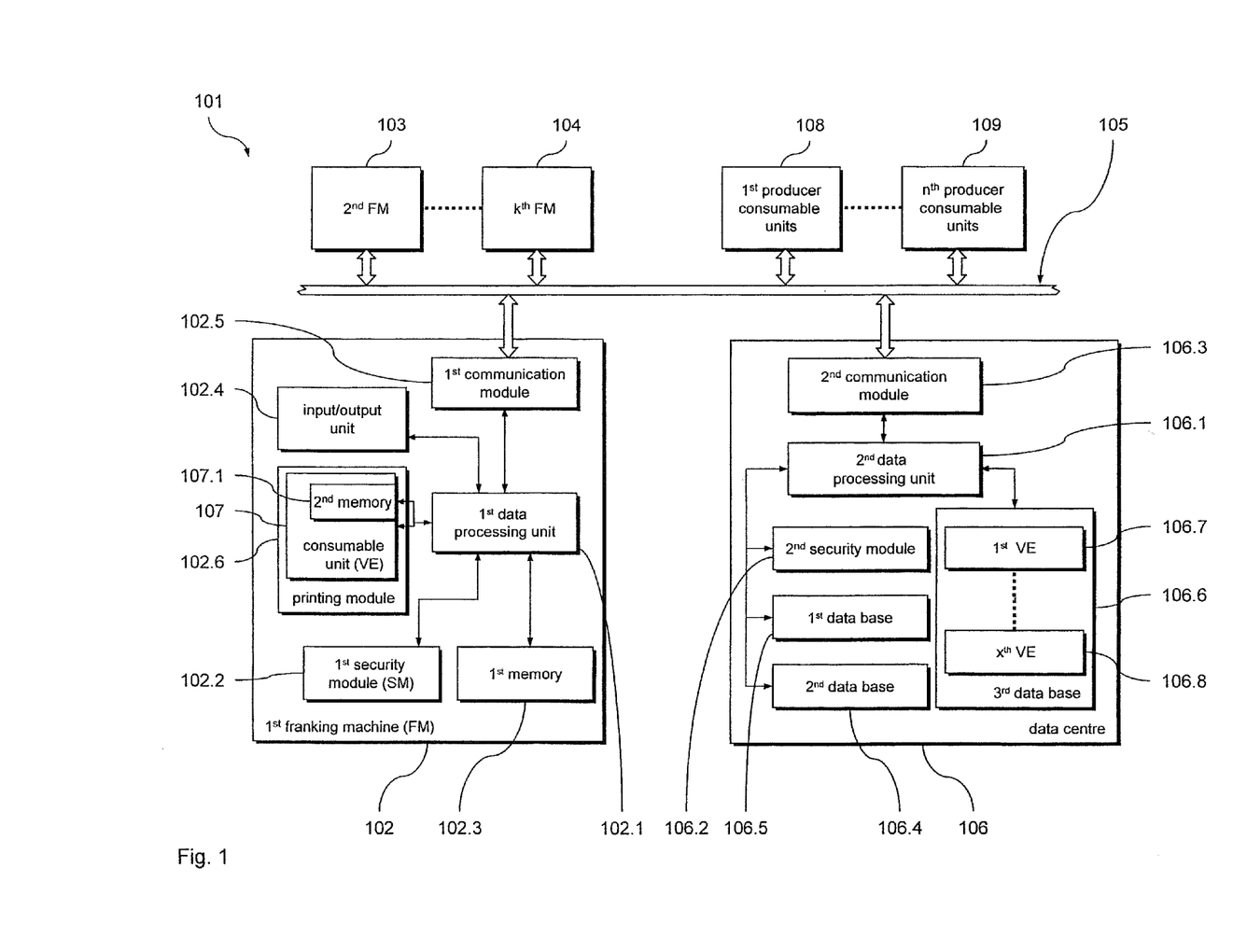
FIG. 1 is a schematic representation of a preferred configuration of the arrangement according to the invention, with which a preferred variant of the method according to the invention for enabling the use of a consumable unit can be performed.

As can be inferred from FIG. 1, the arrangement 101 comprises a series of k consumption arrangements in the form of franking machines (FM), to which inter alia a first franking machine 102, a second franking machine 103 and a $k^{th}$ franking machine 104 belong. The franking machines 102 to 104 can in each case be connected via a communications link, for example a data network 105 (e.g. the Internet), with a remote data center 106.

The franking machine 102 comprises inter alia a data processing unit in the form of a first processor 102.1, a first security module 102.2, a first memory 102.3, an input/output unit 102.4, a communications module 102.5 and a consumption device in the form of a print module 102.6, which in each case are connected with the first processor 102.1.

The print module 102.6 serves in the normal way, controlled by the processor 102.1, to generate a franking imprint for an item of mail. For this purpose in addition to a print head controller (not shown in more detail) connected with the processor 102.1 it has a print head operated by the print head controller. In this case the print head is a component of a consumable unit (VE) used in the print module 102.6 in the form of an ink cartridge 107.

The ink cartridge 107 contains in a reservoir as the consumable material an ink specified by the postal service for generating franking imprints. The ink can be characterised by a special colour (e.g. the postal blue of Deutsche Post AG) but also by other so-called security features (such as for example fluorescent particles or similar).

It shall be understood that with other variants of the invention it can also be provided that the print head is designed as a fixed component of the print module and only the consumable material (thus for example the ink, toner, ribbon, etc.) is held in the consumable unit (VE).

The ink cartridge 107 also comprises a second memory 107.1, which in the full state of the ink cartridge 107 used in the print module 102.6 via a contacting unit is connected with the first processor 102.1. Here the second memory 107.1 and/or the contacting unit can be applied to the ink cartridge 107 in such a way that the print head of the ink cartridge 107 can no longer be correctly operated, if the second memory 107.1 has been physically manipulated, thus for example removed and re-inserted or replaced by another memory. Such a security mechanism can be omitted in other variants of the invention, however.

The first security module 102.2 is used in the normal way to provide the security-related postal services necessary for franking, such as for example the secure accounting of the franking sums but also the cryptographic securing of certain postal data. The first security module 102.2 also allows cryptographic operations to be performed for the purposes of securing further data, securing of communications via the data network 105 and decryption and verification of cryptographic secured data received.

In order to perform cryptographic operations, in particular the secure accounting for the franking sums the first security module 102.2 comprises in a sufficiently known manner a processor, an encryption module for performing cryptographic operations (using cryptographic algorithms and parameters) and corresponding (optionally redundant) registers for storing the accounting data, which are arranged in an area secured physically and logically against unauthorized access.

The data center 106 comprises a second data processing unit 106.1, a second security module 106.2, a communications module 106.3, a first database 106.4, a second database 106.5 and a third database 106.6, which in each case are connected to the second processing unit 106.1. Here, the second security module 106.2 provides in a sufficiently known manner security-related services such as for example cryptographic protection, decryption and verification of certain postal or non-postal data or the protection of communications via the data network 105.

The data center 106 can also via the data network 105 be connected with a series of n remote data centers of producers of consumable units (VE), thus ink cartridges 107. These include inter alia a first producer's data center 108 and an $n^{th}$ producer's data center 109.

As will be explained in the following using the first franking machine 102 (representative of all other franking machines), with the arrangement 101 for the first franking machine 102 a method according to the invention for enabling the use of the ink cartridge 107 in the print module 102.6 of the first franking machine 102 is carried out.

Initially in a step 110.1 the sequence of operations of the method according to the invention is started. In a step 110.2 the production of authorized consumable units then takes place in the producers' data centers 108 to 109. For this purpose the respective producer's data center 108, 109 through cryptographically secured communications via the data network 105 requests a certain number of valid first items of identification information in the form of valid serial numbers (SN) from the data center 106.

The data center 106 generates these valid serial numbers as unique and unambiguous items of identification information of the respective ink cartridge 107 according to a predefined scheme, wherein each serial number SN in the present example is 256 bits long and consists of three parts (SN1, SN2 and SN3). It shall be understood, however, that with other variants of the invention any other length or another structure can be selected.

In the present example the first part SN1 (here: bits 0 to 7) of the serial number is an identifier allocated to the respective producer and the type of ink cartridge. The second part SN2 (here: bits 8 to 127) of the serial number is a unique integer issued in increasing value (thus 1, 2, 3 . . .). The third part SN3 (here: bits 128 to 255) of the serial number is comprised in the present example the lowest 128 bits of a cryptographic operation, which applied the second security module 106.2 to a data packet formed by the first part SN1, the second part SN2 and a secret code SK. The secret code SK contains the second security module 106.2 here from the first database 106.4 of the first data center 106.

In the present example it is a case with the cryptographic operation of the application of a hash algorithm (for example SHA 1, SHA 256, MD4 etc.), here of SHA 256. It shall be understood, however, that for other variants of the invention another cryptographic operation, for example a simple encryption or a digital signature via parts SN1, SN2 can also be performed. Of course, any combinations of such cryptographic operations can also be applied.

The third part SN3 of the serial number SN thus represents an item of control information, which the data center 106 for example can use at a later point in time in order to verify the authenticity of the serial number SN.

The respective producer's data center 108, 109 then receives via the data network 105 the serial numbers SN requested, while the data center 106 archives the serial numbers in the second database 106.5. It shall be understood, however, that such archiving of the serial numbers can optionally also be dispensed with since the serial numbers can have their authenticity verified using the item of control information SN3.

The respective producer's data center 108, 109 in each case writes such a serial number SN to the second memory 107.1 of the respective ink cartridge 107. Then the cartridges are sold in the conventional way to the users of the franking machines 102 to 104, wherein the ink cartridges in the present example are sold at a considerably lower selling price than is normally the case.

In a step 110.3 in the respective franking machine 102 to 104 it is verified if an ink cartridge 107 has been used in the print module 102.6. Such use of an ink cartridge 107 within the meaning of the present invention constitutes a (non-temporal) event, which in a step 110.4 triggers the generation and transmission of a first item of authorization information AUT1 from the franking machine 102 to the data center 106.

It shall be understood that with other variants of the invention additionally or alternatively to this non-temporal event of the use of the ink cartridge any other temporal or non-temporal events can be provided for which trigger the generation and transmission of the first item of authorization information AUT1. Thus for example in at regular intervals an attempt can be made to generate and transmit the first item of authorization information AUT1, wherein then for example in the absence of an ink cartridge only (optionally with additional information on the status of the franking machine) an item of status information can be transmitted to the data center, that no cartridge is inserted.

Here, the first item of authorization information AUT1 comprises in addition to the serial number SN read out from the second memory 107.1 of the ink cartridge 107 by the processor 102.1 a first item of fill level information FS similarly read out from the ink cartridge 107 and/or the first memory 102.3, which is representative of the current fill level of the ink in the reservoir of the ink cartridge 107 (thus of the available quantity of ink).

This fill level FS can be obtained by a separate ink sensor in the reservoir of the ink cartridge 107. Similarly, however, it is possible to read out the fill level FS from the second memory 107.1 and/or the first memory 102.3, where in the ink cartridge 107 electronic fill level monitoring is provided, and with which each use of ink (for example via adequately known droplet counting or similar), preferably irreversibly, certain memory areas of the second memory 107.1 are written to, so that an item of fill level information that is representative of the current fill level FS can always be inferred from the second memory 107.1. This fill level FS is preferably also documented in parallel (preferably cryptographically secured against undetected unauthorized manipulation) in the first memory 102.3, as will be explained in more detail below.

As a further component the first item of authorization information AUT1 in the present example has a second item of identification information assigned to the franking machine 102 in the form of a (preferably naturally unique and unambiguous) second serial number SNFM of the franking machine 102 attached.

The first item of authorization information AUT1 is compiled by the first processor 102.1, optionally cryptographically protected by the security module 102.2 and transmitted via the communications module 102.5 to the data center 106 in a first transmission step of step 107.4.

In a first verification step 110.5 the data center 106 initially verifies in a sub-step 110.6, that the serial number SN of the ink cartridge 107 transmitted with the first item of authorization information AUT1 is a valid serial number. To do this the processor 106.1 of the data center 106 compares the current serial number SN transmitted with the serial numbers archived in the second database 106.5.

If there is correspondence here with an archived serial number, then the serial number is valid. If this is not the case, in a further step of the sub-step 110.6 the current transmitted serial number by means of its item of control information SN3 and by accessing the first database 106.4 can be have its authenticity verified. If this verification is also negative, then in a sub-step 110.8 of a first authorization step 110.7 a second item of authorization information AUT2 with negative contents is generated which then leads to enabling of use of the ink cartridge 102 being denied.

Here it shall be understood that this second verification using the item of control information SN3 may also be absent. Equally, however, it can for example in the absence of archiving of the generated serial numbers in the data center, represent the only verification of the current transmitted serial numbers.

If at least one of the verifications in sub-step 110.6 is positive, in a further sub-step 110.9 of the first verification step 110.6 a check on the plausibility of the further information from the first item of authorization information AUT1 is made.

For this in sub-step 110.9 initially the transmitted first item of fill level information FS is checked for plausibility. Thus in the third database 106.6 an entry (106.7 to 106.8) allocated to the respective serial number SN issued by the data center may be present, which inter alia shows the desired fill level SFS and corresponding upper and lower fill level tolerances TFS for an unused ink cartridge. If the transmitted item of fill level information FS is outside the tolerance range calculated from these, thus a specified item of fill level limit information, then likewise a jump may be made to step 110.8 and a second item of authorization information AUT2 with negative content generated, which then leads to enabling of use of the ink cartridge 102 being denied. For this the second item of authorization information AUT2 can comprise an item of negative enabling information FRIN, which in the franking machine 102 subsequently leads to enabling of use of the ink cartridge 107 being denied.

As a further plausibility check in sub-step 110.9 a verification of the transmitted serial number of the franking machine SNFM can take place. Here again for example using corresponding entries in the third database 106.6 it can be verified if the ink cartridge 107 is authorized for use in franking machine 102. If this is not the case, similarly a jump can be made to step 110.8 and a second item of authorization information AUT2 with negative content (thus with an item of negative enabling information FRIN) generated.

It shall be understood that in sub-step 110.9 the plausibility checks described and further plausibility checks can be carried out individually or in any combination. It shall similarly be understood that sub-step 110.9 can optionally also be omitted.

If the plausibility checks in sub-step 110.9 are positive, in an ascertainment step 110.10 of the verification step 110.5 it is verified if the ink cartridge 107 is a used or an unused ink cartridge. In the present example this takes place simply in that it is detected if during the previous verification of the serial number SN in step 110.6 it was a case of the first verification of this serial number SN in the data center 106.

Here it should be noted that in the sequence described above with the verification of the item of fill level information FS in step 110.9 the detection that an unused ink cartridge is involved also takes place using this item of fill level information FS. It shall be understood, however, that with the other variants of the invention, in which no such plausibility check of the item of fill level information FS takes place, it is also possible to infer an unused ink cartridge exclusively from the first verification of the serial number SN.

If in the ascertainment step 110.10 it is ascertained that an unused ink cartridge is involved, in an accounting step 110.11 accounting takes place in that in the data center 106 an accounting memory assigned to the registered user of the franking machine 102 is modified accordingly. In this way, in the manner described extensively at the outset, it is possible to postpone payment for use of the ink cartridge 102 to a point in time that is considerably closer to the point in time of actual use than is the case with the conventional method by which the full price has to be paid at the same time as the ink cartridge is purchased.

Apart from the advantages extensively described at the outset concerning the commercial attractiveness of bringing into circulation pirated products (that is to say counterfeit or refilled ink cartridges) this has the advantage that for ink cartridges, which between purchase and actual usage are lost or become completely unusable (for example due to damage, obsolescence from being held in stock too long, and so on), the user only has to pay the considerably lower purchase price and thus suffers a lower commercial loss than with conventional systems where the full usage price has to be paid at the time of purchase of the ink cartridge.

In a step 110.12 in the second security module 106.2 using a secret code of the data center 106 a cryptographic certificate ZERT is then created by means of an item of certification information ZI, which comprises at least parts of the first item of authorization information AUT1, preferably the entire first item of authorization information AUT1. The item of certification information ZI also comprises inter alia an item of initial verification time information representative of the point in time that the verification step 110.5 was first carried out, in this way therefore also that of the generation of the certificate ZERT and an item of validity information GI, which is representative of the duration of the validity of the certificate ZERT.

The validity information GI is preferably selected as a function of the physical lifetime of the ink cartridge 107 (thus the period over which the ink cartridge 107 can fulfil its purpose correctly, for example thus the ink is still usable). In this way it can therefore be provided that the validity of the certificate ZERT ends with the lifetime of the ink cartridge 107, wherein of course certain time tolerances can be provided which ensure that the ink cartridge 107 can be used across its entire physical lifetime. It shall similarly be understood however that a period of validity for the certificate ZERT that differs from this lifetime can also be selected.

In a step 110.13 a second item of authorization information AUT2 with positive content is then generated, which subsequently leads to enabling of use of the ink cartridge 107 in the franking machine 102. This second item of authorization information AUT2 comprises inter alia the previously created certificate ZERT and an item of positive enabling information FRIP, which optionally as well via cryptographic means, for example a digital signature SIG, is secured and authenticated and subsequently in the franking machine 102 leads to enabling of use of the ink cartridge 107.

In a subsequent logging step or registration step 110.14 a registration of the ink cartridge 107 in the data center 106 takes place. To this end the entry 106.7 assigned to its serial number SN is updated accordingly in the third database 106.6, so that in the entry 106.7 a verification history H assigned to the respective ink cartridge 107 is stored. Here inter alia the certificate ZERT is archived in the entry 106.7. Similarly in the entry 106.7 the number of first verification steps 110.5 previously carried out is updated, and thus in the case of this verification step 110.5 being carried out for the first time the corresponding part of the entry 106.7 is set to a value of one. Finally, the item of fill level information FS and the serial number SNFM of the franking machine 102 sent with the first item of authorization information AUT1 are logged in the entry 106.7.

It shall be understood that in connection with the logging further information can of course be logged in the verification history H of the entry 106.7. Thus for example the second item of authorization information AUT2 (with the item of positive enabling information FRIP or the item of negative enabling information FRIN) can similarly be logged just like the item of enabling information FRIN or FRIP. Similarly, of course, further items of plausibility information can be stored in the verification history H, which are used at a later point in time in connection with a further execution of the first verification step 110.5 during the plausibility checks from step 110.9.

The logging entry of the verification history H in area 106.7 is finally provided with an item of logging time information PZI representative of the point in time of the logging.

In a second transmission step 110.15 the transmission of the second item of authorization information AUT2 to the franking machine 102 takes place.

Figure 2A:
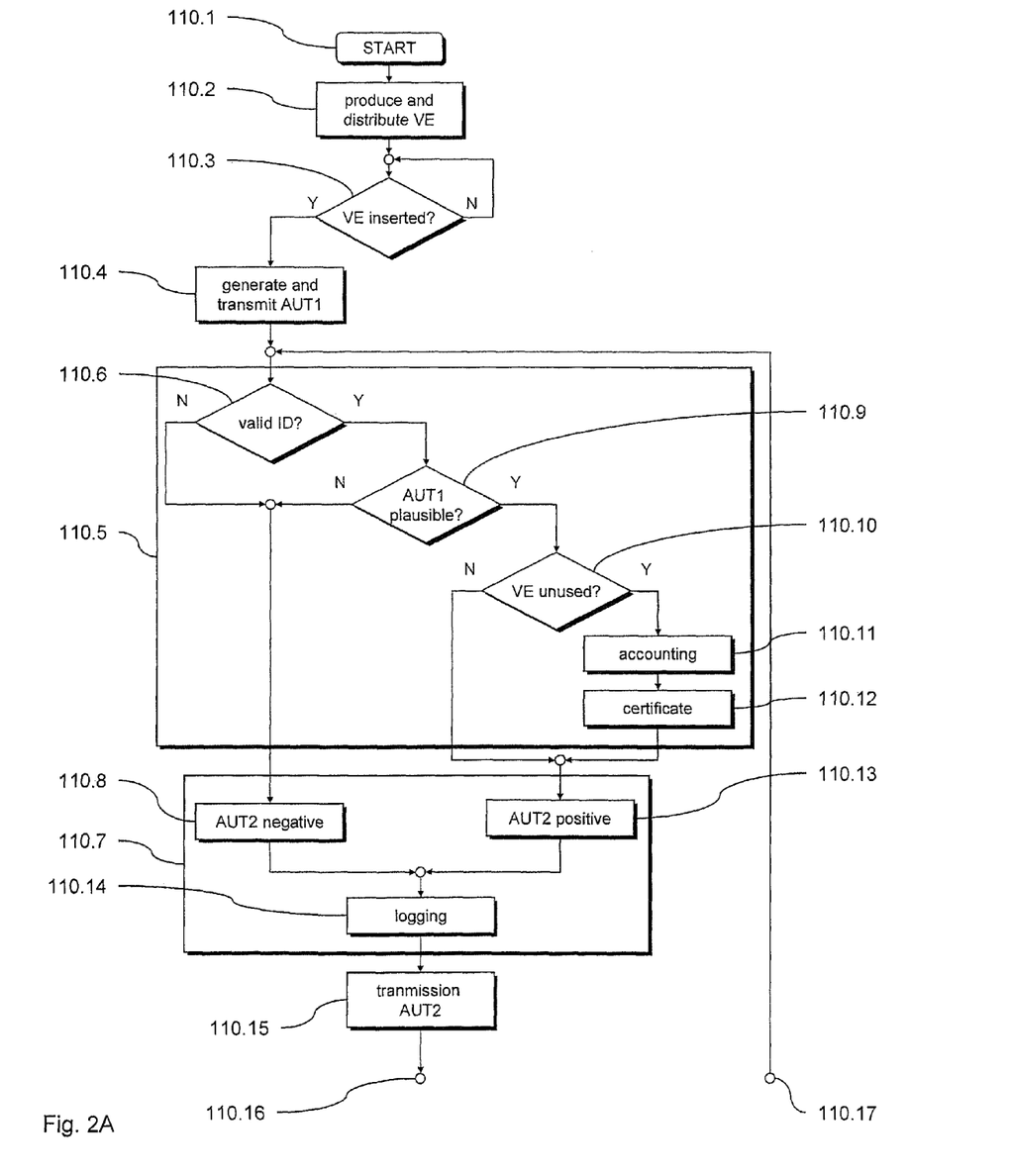
FIG. 2A is the first part of a flow chart of a preferred variant of the method according to the invention, which can be carried out with the arrangement from FIG. 1.
Figure 2B:
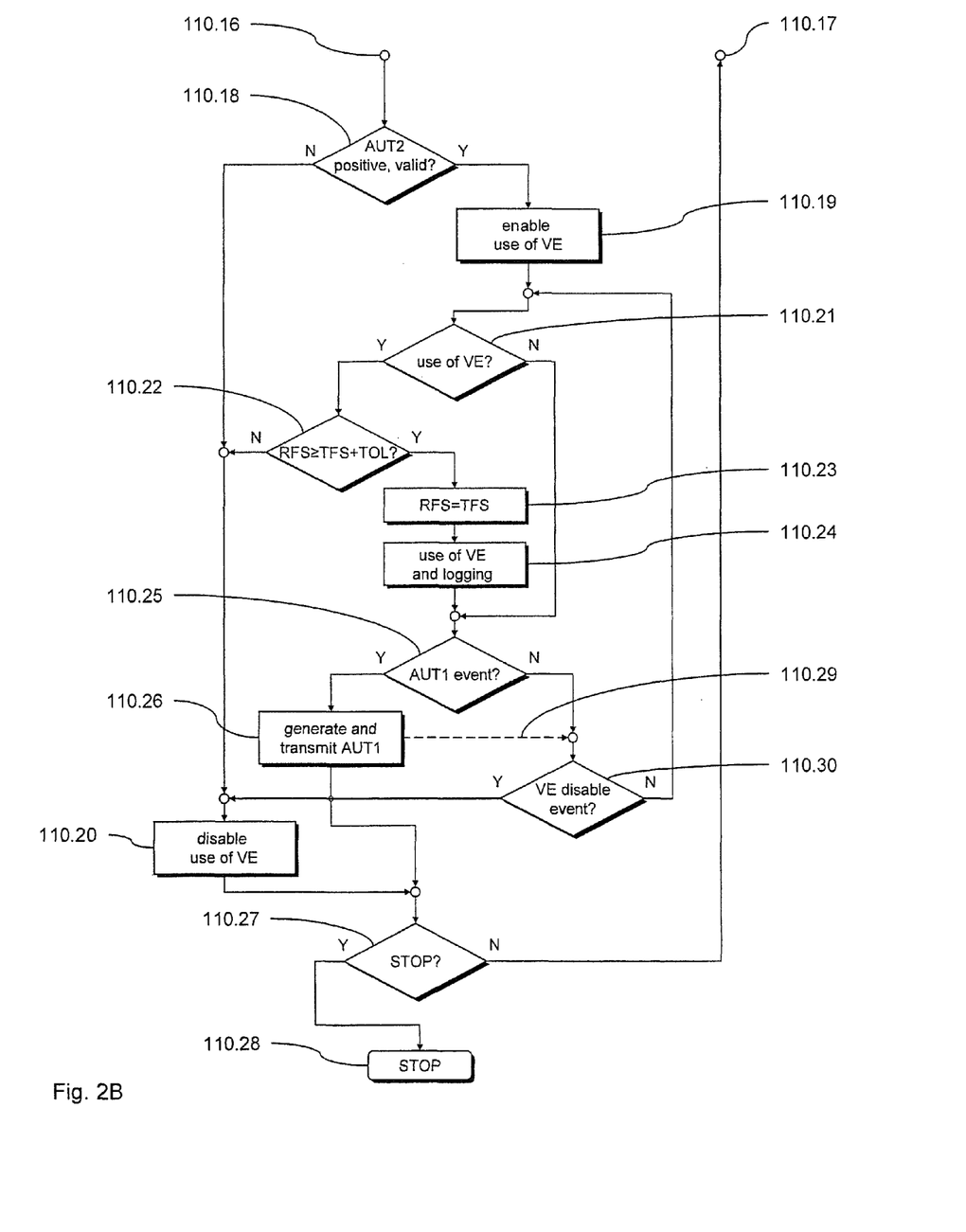
FIG. 2B is the second part of the flow chart of the method from FIG. 2A.

As can be inferred from FIG. 2B (the links of which to FIG. 2A are shown by points 110.16 and 110.17), in a second verification step 110.18 in the franking machine 102 a verification of the second item of authorization information AUT2 received then takes place, wherein its authenticity is checked in that the digital signature SIG of the security module 106.2 of the data center 106 is verified.

The processor 102.1 also analyses the enabling information sent with the second item of authorization information AUT2. If this is an item of positive enabling information FRIP, then use of the ink cartridge 107 is enabled in a step 110.19 and a corresponding message is output via the output unit 102.4. If it is an item of negative enabling information FRIN, then use of the ink cartridge 107 is disabled in a step 110.20 and a corresponding message is output via the output unit 102.4.

In a further step 110.21 in the franking machine 102 it is then verified if use of the ink cartridge 107 should take place, and in so doing therefore if a franking imprint or other imprint should be generated with the ink cartridge 107.

If this is the case, in the present example in a further step 110.22 in the processor 102.1 of the franking machine 102 it is verified if a theoretical fill level RFS of the ink cartridge 107 is below a tolerance range, resulting from an actual fill level TFS and a fill level tolerance TOL.

Here, the theoretical fill level is the result of the use of the ink cartridge 107 prior to the current step 110.22, which has been logged in the first memory 102.3 (preferably secured by cryptographic means against undetected manipulations), as is explained in more detail in the following. If the current use is the first use of the ink cartridge, for the theoretical fill level RFS its nominal fill level from at the factory is used which for example can likewise be read out from the second memory 107.1 or alternatively with the second item of authorization information AUT2, in particular as a component of the certificate ZERT, can be transmitted from the data center 106.

The actual fill level TFS can, as described above, be detected by a corresponding sensor on the ink cartridge 107. The fill level tolerance TOL takes into account possible variations that occur in practice in normal authorized use in the fill level of the ink cartridge 107 (as can occur, for example, from the filling of the ink cartridge 107).

If the theoretical fill level RFS is below the sum of the actual fill level TFS and the fill level tolerance TOL, thus taking into consideration the fill level tolerance TOL actually more ink is available than calculated from the previous use, then this is indicative of an unauthorized filling or refilling of the ink cartridge 107. Accordingly in this case a jump is made to step 110.20 and use of the ink cartridge 107 is disabled.

Otherwise the value of the theoretical fill level RFS is set in the first memory 102.3 of the franking machine 102 in a step 110.23 at the value of the actual fill level TFS, and in this way therefore the theoretical fill level RFS is rest to the actual fill level TFS. The same applies for the second memory 107.1 of the ink cartridge 107, which is likewise accordingly written to irreversibly, in order to log the actual fill level FS of the ink cartridge 107 there.

In a step 110.24 the use of the ink cartridge 107 then takes place and logging of this use, wherein the theoretical fill level RFS in the first memory 102.3 of the franking machine 102 and the second memory 107.1 of the ink cartridge 107 is reduced by a value corresponding to the current usage. For this the first processor 102.1 can for example use a sufficiently known droplet counting for the current imprint (thus the current usage). In this way the theoretical fill level RFS will be kept at the current level both in the ink cartridge 107 and in the franking machine 102 with each use.

In a step 110.25 it is then verified if an event is present which results in a regeneration and transmission of the first item of authorization information AUT1 to the data center 106. This also takes place if in step 110.21 it is ascertained that currently no use should be made of the ink cartridge 107.

Such an event, resulting in a regeneration and transmission of the first item of authorization information AUT1 to the data center 106, can be a case of any temporal or non-temporal event. Thus for example the expiry of a certain length of time T1 can be provided as a temporal event, after which a regeneration and transmission of the first item of authorization information AUT1 is absolutely essential. Similarly expiry of the validity of the certificate ZERT may also be involved. Non-temporal events can for example be considered as the removal of the ink cartridge 107 from the print module 102.6, the reaching of a defined number N1 of uses of the ink cartridge 107 or the reaching of a defined theoretical fill level RFS1 or also the reinsertion of the ink cartridge 107 in the print module 102.6.

If such an event exists in a step 110.26 a new first item of authorization information AUT1 is generated and transmitted to the data center 106. Here the procedure is as described in connection with step 110.4, wherein for the item of fill level information FS of the first item of authorization information AUT1 the theoretical fill level RFS read out from the first memory 102.3 is used. In addition the first item of authorization information AUT1 can comprise in addition to the serial number SN of the ink cartridge 107, the serial number SNFM of the franking machine 102 and the item of fill level information FS, the certificate ZERT also.

Initially, in a step 110.27, it is further verified if the procedure is to be ended. If this is the case the procedure ends in a step 110.28. Otherwise a jump back to step 110.5 is made, wherein then the plausibility checks in step 110.9 take place using the newly transmitted item of fill level information FS and also a verification and checking of the certificate ZERT, in particular a check of its validity, by accessing the assigned verification history H in the entry 106.7 assigned to the ink cartridge 107 in the third database 106.6.

Furthermore, in step 110.9 independently of the validity of the certificate ZERT it is also verified if a certain length of time has passed since the first execution of the verification step 110.5. If this is the case, it can be provided that in this case also a second authorization message AUT2 is generated with an item of negative enabling information FRIN.

Depending on the outcomes of the checks in steps 110.6, 110.9 and 110.10 in turn a second authorization message AUT2 with an item of positive enabling information FRIP or an item of negative enabling information FRIN is generated (step 110.13 or 110.8), which then in the manner described above with the updating of the verification history H is logged in the assigned entry 106.7 (step 110.14), transmitted by the data center 106 to the franking machine 102 and processed there in the manner described (steps 110.18, 110.19, 110.20 etc.).

In particular in the present example it is provided that in the event that for a formerly valid ink cartridge 107 or a formerly valid serial number SN in the event of generation of an item of negative enabling information FRIN a so-called deregistration of this serial number SN in the data center 106 takes place. For this a corresponding modification to the assigned entry 106.7 of the third database 106.6 is made. This has the result that during a subsequent repeated execution of the step 110.6 it is already ascertained that it is no longer a case of a valid serial number SN.

It shall be understood that with other variants of the invention in connection with this deregistration it can also be provided that the entry 106.7 is simply irreversibly deleted in the third database 106.6.

It can also be provided that the ink cartridge 107 has in the meantime been used in the second franking machine 103, with the result that this is ascertained in step 110.9 from the serial number of the second franking machine 103 transmitted (with the newly generated first item of authorization information AUT1).

In the present example it can be provided that the use of the ink cartridge 107 is only authorized in the first franking machine 102, in which it was registered for the first time. In this case there will be a negative outcome to the verification in step 110.9 and a second item of authorization information AUT2 with an item of negative enabling information FRIN results.

For the user of a plurality of franking machines in a group of franking machines registered at the data center 106 it can however be provided that a change in use of the ink cartridge 107 between the franking machines of this group of franking machines is authorized. In this case when the ink cartridge 107 is used in another franking machine, for example the franking machine 104, a positive outcome to the verification in step 110.9 and a second item of authorization information AUT2 with an item of positive enabling information FRIP for the franking machine 104 also result.

Furthermore such a change of the ink cartridge 107 can also be authorized as a function of an identifier contained in the serial number of the ink cartridge 107 (for example within the first 8 bits of the serial number SN). Thus ink cartridges for universal application (i.e. in any number of different franking machines 102 to 104) can be defined. Similarly, use can be restricted to a definable number of different franking machines 102 to 104.

As shown in FIG. 2B by the branch 110.29, in the present example it is provided that following expiry of a further length of time T2 and/or after a further specified number N2 of uses of the ink cartridge 107 and/or after reaching a further theoretical fill level RFS2 a (possibly temporary) disabling of the use of the ink cartridge 107 takes place, if the triggering of the generation and transmission of the new item of authorization information AUT1 takes place by expiry of the length of time T1, the reaching of the number N1 of uses of the ink cartridge 107 or the reaching of the theoretical fill level RFS1 results.

The event triggering this disabling is verified in the franking machine 102 in a step 110.30, wherein in the case that no such event exists a jump back to step 110.21 is made and the use of the ink cartridge 107 in the franking machine can continue to take place.

In the example described above the accounting step 110.11 takes place in the data center 106. It shall be understood, however, that the accounting step in other variants of the invention can also take place at another point in time after the ascertainment step 110.10. In particular the accounting step can also take place in the franking machine 102, for example in its security module 102.2, wherein the second item of authorization information AUT2 then contains a corresponding item of accounting information which is correspondingly processed and acted upon in the franking machine 102.

In the example described above the verification of whether the ink cartridge 107 can be used in various franking machines, could take place as a function of an identifier stored in the serial number SN of the ink cartridge 107. It shall be understood that one or a plurality of the verifications described above can also take place as a function of such an identifier in the serial number of the ink cartridge 107.

It is mentioned at this point that all or some of the memories of the franking machine 102 and the data center 106 described above can take the form of separate memory modules or also simply individual memory areas of a single memory module of the franking machine 102 or of the data center 106.

The present invention has been described above using examples relating to franking machines. It shall be understood, however, that it can also be used in connection with other franking arrangements (for example so-called PC franking systems), in which no integration of the individual components in a single housing exists. Similarly the present invention can also be used in association with any other consumption arrangements, in which any consumable medium is consumed in a corresponding consumption arrangement.

Although modifications and changes may be suggested by those skilled in the art, it is the intention of the inventor to embody within the patent warranted hereon all changes and modifications as reasonably and properly come within the scope of his contribution to the art.

We claim:

1. Method for enabling the use of a consumable unit containing a consumable medium in a consumption device of a consumption arrangement, comprising:

in a first transmission step, a first item of authorization information assigned to the consumable unit is transmitted from a data processing unit of the consumption arrangement via a communications network to a remote data center;

in a first verification step in the data center, a verification of the first item of authorization information takes place;

in an ascertainment step in said first verification step, ascertaining that said consumable unit was previously unused;

in an authorization step in the data center, as a function of the outcome of the first verification step a second item of authorization information assigned to the consumable unit is generated;

in a second transmission step, the second item of authorization information is transmitted via a communications network to the data processing unit;

in a second verification step in the data processing unit, a verification of the second item of authorization information takes place;

in an enabling step in the data processing unit, as a function of the outcome of the second verification step, enabling the use of the consumable unit in the consumption device takes place; and in an accounting step, as a function of the outcome of the first verification step and/or of the second verification step, accounting for enabling the use of the consumable unit in the consumption device, comprising payment of a usage fee, by a user of said consumption arrangement, for use of said consumable unit, only when, in said ascertainment step of the first verification step, it is ascertained that the consumable unit was previously unused.

2. Method according to claim 1, wherein:
the first item of authorization information comprises a unique and unambiguous first item of identification information of the consumable unit;
the ascertainment, that the consumable unit is unused, in the ascertainment step takes place using the first item of identification information by comparing the first item of identification information with a first item of comparative information stored in the data center and ascertaining an unused consumable unit in the ascertainment step only takes place if, for the first time, a definable relationship between the first item of identification information and the first item of comparative identification information exists.

3. Method according to claim 1, wherein:
the first item of authorization information comprises a first item of fill level information, which is representative of the quantity of the consumable medium available in the consumable unit; and
ascertaining that the consumable unit is unused, takes place using the first item of fill level information.

4. Method according to claim 1, wherein:
the first item of identification information comprises an item of control information, which in particular is generated using cryptographic means;
the verification of the first item of authorization information in the first verification step comprises a verification of whether a definable relationship between the item of control information and a further part of the first item of identification information exists; and
enabling the use of the consumable unit takes place only if the definable relationship between the item of control information and the further part of the first item of identification information exists.

5. Method according to claim 1, wherein:
in the authorization step in the data center, in a registration step a registration of the first verification step takes place in a verification history stored in the data center and assigned to the consumable unit by assignment to the first item of identification information;
the verification history comprises a number of first verification steps assigned to the consumable unit by assignment to the first item of identification information, and/or comprises an item of verification time information at least representative of the point in time of the current first verification step and/or an item of initial verification time information representative of the first point in time of execution of the first verification step assigned to the consumable unit by assignment to the first item of identification information, and/or comprises at least a second item of identification information assigned to the data processing unit and/or comprises at least a first item of fill level information representative of a quantity of consumable medium currently available in the consumable unit; and/or
the verification history comprises at least a part of the second item of authorization information, in particular the entire second item of authorization information.

6. Method according to claim 5, wherein:
the first item of authorization information comprises a first item of fill level information, which is representative of the quantity of the consumable medium available in the consumable unit;
in the first verification step, a comparison is made between the first item of fill level information and an item of fill level limit information assigned to the consumable unit and/or at least a previous first item of fill level information from the verification history assigned to the consumable unit, originating from a last authorization step previously carried out;
enabling the use in the enabling step only if a definable relationship between the first item of fill level information and the previous first item of fill level information exists, in particular the available quantity of the consumable medium is less than the previously available quantity of the consumable medium from the previous authorization step; and/or
in a definitive disabling step a permanent disablement of use of the consumable unit takes place, if a definable relationship between the first item of fill level information and the previous first item of fill level information exists, in particular the available quantity of the consumable medium is greater than the previously available quantity of the consumable medium from the previous authorization step; and/or
in a definitive disabling step, a permanent disablement of use of the consumable unit takes place if a definable relationship between the first item of fill level information and the item of fill level limit information exists, in particular the available quantity of the consumable medium has reached or fallen below a limiting quantity of the consumable medium defined by the item of fill level limit information; and
in the definitive disabling step the first item of identification information is assigned an item of disabling information in the data center, in the first verification step a verification is carried out, of whether the consumable unit has been assigned an item of disabling information, and enabling the use in the enabling step only takes place if the consumable unit is not assigned any item of disabling information.

7. Method according to claim 5, wherein:
the first item of authorization information comprises a second item of identification information assigned to the data processing unit, in the first verification step a comparison is made between the second item of identification information and at least one previous second item of identification information from the verification history assigned to the consumable unit, originating from a previous authorization step, in particular the last authorization step previously carried out, and enabling the use in the enabling step only takes place if a definable relationship between the second item of identification information and the previous second item of identification information exists, in particular the second item of identification information is identical to the previous second item of identification information; and/or
in the first verification step, a comparison is made between a current item of time information and the item of initial verification time information from the verification history assigned to the consumable unit and enabling the use in the enabling step only takes place if a definable relationship between the current time information and the item of initial verification time information exists, in particular a time difference between the current item of time information and the item of initial verification time information is less than a definable maximum usage time of the consumable unit.

8. Method according to claim 1, wherein:

the first transmission step takes place as a function of the occurrence of at least one definable first event; and the at least one definable first event is at least one of creation of a connection between the data processing unit and the consumable unit, release of a connection between the data processing unit and the consumable unit, reaching of a definable first number of uses of the consumable unit, reaching a definable first consumption of the consumable medium, and reaching a definable first quantity of the consumable medium still available in the consumable unit.

9. Method according to claim 1, wherein:

in a temporary disabling step, a reversible disabling of the use of the consumable unit takes place as a function of the occurrence of at least one definable second event;

the at least one definable second event is at least one of release of a connection between the data processing unit and the consumable unit, reaching a definable second number of uses of the consumable unit, reaching a definable second consumption of the consumable medium, and reaching a definable second quantity of the consumable medium still available in the consumable unit; and/or the temporary disabling step takes place only if, after a last occurrence of the first event and prior to an occurrence of the second event, no enabling step takes place.

10. Method according to claim 1, wherein:

the first item of authorization information at least prior to the first transmission step and/or during the first transmission step is secured by cryptographic means against undetected unauthorized manipulation; and/or the second item of authorization information at least prior to the second transmission step and/or during the second transmission step is secured by cryptographic means against undetected unauthorized manipulations, and the second item of authorization information comprises at least a cryptographic certificate generated by the data center in the authorization step, which in a verification step prior to the enabling step is verified by the data processing unit, and enabling of use takes place as a function of the outcome of the verification step; and/or the first item of authorization information comprises a previous cryptographic certificate generated in a previous authorization step, in particular immediately prior to the first transmission step, wherein the previous cryptographic certificate is verified in the first verification step.

11. Method according to claim 1, wherein:

in the data processing unit after the enabling step, a detection of the consumption of the consumable medium takes place, by using a use detected by the data processing unit of the consumable unit and/or a previous item of fill level information, a theoretical item of fill level information, is ascertained that is representative of the theoretical available quantity of the consumable medium available in the consumable unit, and/or, via a detection unit, an actual item of fill level information is identified, which is representative of the actual quantity of consumable medium available in the consumable unit;

the theoretical item of fill level information is compared with the actual item of fill level information in the data processing unit in a fill level verification step and the theoretical item of fill level information is set to the value of the actual item of fill level information, if the actual available quantity is less than the theoretical available quantity by a first tolerance value; and/or in a disabling step, a disabling of use of the consumable unit by the data processing unit takes place, if the actual available quantity exceeds the theoretical available quantity by a definable second tolerance value.

12. Method according to claim 1, wherein:

in the accounting step for performing the accounting the content of at least one accounting memory is modified;

the at least one accounting memory is arranged in the data processing unit; and/or the at least one accounting memory is arranged in the data center.

13. Method according to claim 1, wherein:

in a production step prior to the first verification step, a plurality of first consumable units and second consumable units is produced, wherein, in a memory of a first consumable unit, a first item of identification information of the first consumable unit is assigned a first identifier, and in a memory of a second consumable unit, a first item of identification information of the second consumable unit is assigned a second identifier; and at least a verification of a definable relationship between first items of information and second items of information takes place in the first verification step and/or in the authorization step and/or in the second verification step and/or in the enabling step and/or in a fill level verification step as a function of the identifier assigned to the consumable unit; and/or at least a monitoring of the occurrence of a definable event as a function of the identifier assigned to the consumable unit takes place.

14. A medium consuming system comprising:

a consumable unit containing a consumable medium;

a consumption arrangement comprising a consumption device configured to use the consumable unit and an associated data processing unit configured to control use of the consumable unit;

a data center remote from the consumption arrangement and connectable via a communications network to the data processing unit;

the data processing unit being configured to, in a first transmission step, transmit a first item of authorization information assigned to the consumable unit via the communications network to the remote data center, and in a first verification step, perform a verification of the first item of authorization information, in an ascertainment step in said first verification step, ascertain that said consumable unit was previously unused, and in an authorization step, generate, as a function of the outcome of the first verification step, a second item of authorization information assigned to the consumable unit, and in a second transmission step, transmit the second item of authorization information via the communications network to the data processing unit;

the data processing unit configured to, in a second verification step, perform a verification of the second item of authorization information, and in an enabling step, enable, as a function of the outcome of the second verification step, use of the consumable unit in the consumption device; and at least one of the data processing unit and the data center being configured to implement, in an accounting step as a function of the outcome of the first verification step and/or of the second verification step, an accounting for enabling the use of the consumable unit in the consumption device, comprising payment of a usage fee, by a user of said consumption arrangement, for use of said consumable unit; and said at least one of the data processing unit and the data center is configured to implement the accounting step comprising said payment only when, in said ascertainment step of the first verification step, it is ascertained that the consumable unit was previously unused.

\* \* \* \* \*